United States Patent
Carteri et al.

(10) Patent No.: US 10,017,332 B2
(45) Date of Patent: Jul. 10, 2018

(54) VACUUM CONVEYOR WITH INTAKE NOZZLE AND SLEEVE

(71) Applicant: Brandt Agricultural Products Ltd., Regina (CA)

(72) Inventors: Jonathan Robert Carteri, Regina (CA); Nicholas Broberg, Regina (CA); Michael Ryan Kaeding, Regina (CA); Chance Peutert, Belle Plaine (CA)

(73) Assignee: Brandt Agricultural Products Ltd., Regina (CA)

( * ) Notice: Subject to any disclaimer, the term of this patent is extended or adjusted under 35 U.S.C. 154(b) by 0 days.

(21) Appl. No.: 15/453,487

(22) Filed: Mar. 8, 2017

(65) Prior Publication Data

US 2017/0355536 A1    Dec. 14, 2017

(30) Foreign Application Priority Data

Jun. 14, 2016   (CA) ...................................... 2932814

(51) Int. Cl.
*B65G 53/42* (2006.01)
*B65G 53/24* (2006.01)

(52) U.S. Cl.
CPC ............. *B65G 53/42* (2013.01); *B65G 53/24* (2013.01); *B65G 2201/042* (2013.01)

(58) Field of Classification Search
CPC ................................ B65G 53/24; B65G 53/42
USPC ... 406/39, 41, 114, 115, 116, 151, 152, 153, 406/194
See application file for complete search history.

(56) References Cited

U.S. PATENT DOCUMENTS

| | | | | |
|---|---|---|---|---|
| 530,829 | A | * 12/1894 | Duckham | B65G 53/42 15/420 |
| 1,053,665 | A | * 2/1913 | Spencer | A47L 9/02 15/415.1 |
| 1,508,521 | A | * 9/1924 | Kreuser | E02F 3/92 37/318 |
| 1,810,981 | A | * 6/1931 | Noble | B01D 29/11 405/127 |
| 2,176,139 | A | * 10/1939 | Lofgren | A47L 9/0072 138/40 |
| 3,117,459 | A | 1/1964 | Schweitzer | |
| 4,028,009 | A | * 6/1977 | Gudzenko | E02F 3/90 166/51 |

(Continued)

FOREIGN PATENT DOCUMENTS

| CA | 2236645 A1 | 11/1999 |
|---|---|---|
| CA | 2249539 A1 | 4/2000 |

(Continued)

*Primary Examiner* — Joseph Dillon, Jr.
(74) *Attorney, Agent, or Firm* — Frost Brown Todd LLC (57) ABSTRACT

A vacuum conveyor for conveying granular material and an intake nozzle for the vacuum conveyor is provided. The vacuum conveyor can have a vacuum section operative to create a vacuum in the housing, an intake to allow granular material to the housing, a variable length hose section and an intake nozzle. The intake nozzle can include an intake end, an output end and a body extending between the ends with a plurality of apertures passing through the body. A sleeve for the intake nozzle can be sized to fit around the body positionable in different positions relative to the body to cover and uncover the various apertures.

35 Claims, 7 Drawing Sheets

(56) References Cited

U.S. PATENT DOCUMENTS

| | | | | |
|---|---|---|---|---|
| 4,261,672 A * | 4/1981 | Marbach | ............. | B65G 53/525 |
| | | | | 406/152 |
| 4,352,251 A * | 10/1982 | Sloan | ............. | B63C 11/52 |
| | | | | 285/33 |
| 4,662,800 A | 5/1987 | Anderson et al. | | |
| 4,881,855 A * | 11/1989 | Rempel | ............. | B65G 53/60 |
| | | | | 198/671 |
| 4,913,597 A | 4/1990 | Christianson et al. | | |
| 5,037,246 A * | 8/1991 | Okano | ............. | B65G 53/42 |
| | | | | 406/113 |
| 5,673,779 A * | 10/1997 | Spickelmire | ............. | B65G 53/42 |
| | | | | 193/30 |
| 6,923,601 B2 * | 8/2005 | Goth | ............. | B65G 53/24 |
| | | | | 406/152 |
| 6,955,506 B2 * | 10/2005 | Kuhnau | ............. | B65G 53/66 |
| | | | | 406/192 |
| 6,974,279 B2 * | 12/2005 | Morohashi | ............. | B65G 53/58 |
| | | | | 406/173 |
| 6,979,152 B2 * | 12/2005 | Bodie | ............. | B65G 53/42 |
| | | | | 15/415.1 |
| 7,278,804 B2 * | 10/2007 | Deal | ............. | E21B 21/062 |
| | | | | 175/206 |
| 7,431,537 B2 * | 10/2008 | Francis | ............. | A01D 87/00 |
| | | | | 406/151 |
| 7,547,162 B2 * | 6/2009 | Rempel | ............. | A01D 87/00 |
| | | | | 406/151 |
| 7,552,817 B2 | 6/2009 | Noble et al. | | |
| 7,794,589 B2 * | 9/2010 | Kozey | ............. | B01D 35/05 |
| | | | | 210/122 |
| 7,862,260 B2 * | 1/2011 | Rempel | ............. | A01D 87/00 |
| | | | | 406/151 |
| 7,959,697 B2 | 6/2011 | Francis | | |
| 8,029,605 B2 * | 10/2011 | Bodie | ............. | B01D 45/08 |
| | | | | 55/396 |
| 8,322,951 B2 * | 12/2012 | Kvalheim | ............. | B65G 53/40 |
| | | | | 406/109 |
| 8,534,961 B1 * | 9/2013 | Yoder | ............. | A01G 13/0287 |
| | | | | 406/135 |
| 8,622,660 B1 * | 1/2014 | Gore | ............. | B60P 1/60 |
| | | | | 406/144 |
| 8,673,063 B2 * | 3/2014 | Kerr | ............. | 55/315 |
| 8,764,400 B2 * | 7/2014 | Kerr | ............. | F04D 23/003 |
| | | | | 416/185 |
| 8,911,182 B2 * | 12/2014 | Bodie | ............. | A01D 69/06 |
| | | | | 198/601 |
| 9,205,999 B2 * | 12/2015 | Woods | ............. | B65G 53/64 |
| 9,555,980 B2 * | 1/2017 | Woods | ............. | B65G 53/64 |
| 9,688,485 B2 * | 6/2017 | Sorensen | ............. | B65G 51/02 |
| 9,702,101 B1 * | 7/2017 | Ficks | ............. | E01H 1/0836 |
| 2004/0265071 A1 * | 12/2004 | Bodie | ............. | B65G 53/42 |
| | | | | 406/151 |
| 2006/0272927 A1 * | 12/2006 | Baber | ............. | A01D 87/10 |
| | | | | 198/689.1 |
| 2009/0035073 A1 * | 2/2009 | Rempel | ............. | A01D 87/00 |
| | | | | 406/53 |
| 2009/0133369 A1 | 5/2009 | Coward et al. | | |
| 2009/0252562 A1 * | 10/2009 | Rempel | ............. | A01D 87/00 |
| | | | | 406/51 |
| 2010/0018536 A1 * | 1/2010 | Hershey | ............. | A61C 1/16 |
| | | | | 128/207.14 |
| 2011/0016664 A1 | 1/2011 | Kerr et al. | | |
| 2012/0121343 A1 | 5/2012 | Kerr et al. | | |
| 2012/0121399 A1 * | 5/2012 | Kerr | ............. | A01D 87/10 |
| | | | | 415/203 |
| 2013/0025453 A1 * | 1/2013 | Kerr | ............. | 95/267 |
| 2013/0084138 A1 | 4/2013 | Kerr | | |
| 2014/0343723 A1 * | 11/2014 | Meier | ............. | B65G 43/00 |
| | | | | 700/230 |
| 2015/0147124 A1 * | 5/2015 | Woods | ............. | B65G 53/64 |
| | | | | 406/151 |
| 2015/0147125 A1 * | 5/2015 | Woods | ............. | B65G 53/64 |
| | | | | 406/151 |
| 2017/0355535 A1 * | 12/2017 | Carteri | ............. | F16H 7/023 |

FOREIGN PATENT DOCUMENTS

| | | |
|---|---|---|
| CA | 2533244 A1 | 7/2007 |
| CA | 2546816 A1 | 11/2007 |
| CA | 2547163 A1 | 11/2007 |
| CA | 2585731 A1 | 10/2008 |
| CA | 2612046 A1 | 5/2009 |
| CA | 2674163 A1 | 1/2011 |
| CA | 2703855 A1 | 1/2011 |
| CA | 2766568 A1 | 2/2011 |
| CA | 2766584 A1 | 2/2011 |
| CA | 2707408 A1 | 12/2011 |
| CA | 2747444 A1 | 1/2013 |
| CA | 2834121 A1 | 5/2015 |
| CA | 2932814 A1 | 12/2017 |
| EP | 2 458 962 A1 | 6/2012 |
| EP | 2 485 963 A1 | 6/2012 |
| WO | WO 2011/011860 A1 | 2/2011 |
| WO | WO 2011/011863 A1 | 2/2011 |
| WO | WO 2011/156898 A2 | 12/2011 |
| WO | WO 2011/156898 A3 | 2/2012 |

\* cited by examiner

VACUUM CONVEYOR WITH INTAKE NOZZLE AND SLEEVE

CROSS-REFERENCE TO RELATED APPLICATION

This application claims priority to and benefit of CA Serial No. 2,932,814, filed Jun. 14, 2016, the contents of which are incorporated by reference in its entirety for all purposes.

FIELD OF THE INVENTION

The invention is in the field of pneumatic or vacuum conveyors such as are commonly used to convey grain or other granular material, and in particular to an intake nozzle for a vacuum conveyor with a sleeve to vary the air flow through the intake nozzle.

BACKGROUND

Agricultural vacuum conveyors for conveying granular material, such as grain, using a vacuum are well known. These vacuum conveyors allow the pickup of the granular material with a flexible hose that allows for considerable freedom of movement. A fan or air pump is used to establish a flow of air from the intake end of the hose through the vacuum conveyor to a discharge. An intake nozzle at the end of the hose is placed in the granular material, and the air being sucked into the intake end picks up and carries the granular material causing there to be a stream of mixed air and granular material that is carried up through the hose. From the hose, this granular material can enter the vacuum intake where it will eventually be deposited in an intake of the conveyor (such as an auger). When the granular material reaches the conveyor, the conveyor can carry the granular material up the length of the conveyor to be discharged into a bin, trailer, truck, etc.

When the intake end of the nozzle is placed in a pile of granular material, the flow of air entering the intake nozzle can be blocked by the granular material and if the suction created by the vacuum conveyor is not great enough to suck up this blockage, the vacuum conveyor could stall out. To address this, vents can be provided on the intake nozzle so that air can enter the nozzle and maintain an air flow entering the vacuum conveyor even if the end of the nozzle is filled with granular material. There are a number of variants of nozzles with these vents, but one version is shown in U.S. Pat. No. 6,979,152.

However, the ideal number and placement of vents is affected by the length of hose used with the vacuum conveyor and in most vacuum conveyors sections of hose can be added or removed depending on the distance between the vacuum conveyor and the granular material to be collected. This means that the vents used in a nozzle will be ideal for one hose length but not as good for others. Some nozzles, such as the one described in U.S. Pat. No. 6,979,152, provide a baffle or sleeve that allows the cross-sectional area of the vents to be varied thereby allowing an operator to restrict the flow of air through these vents, but these systems rely on the operators judgment and the restriction in the size of the vents can affect the air flow passing through these vents making the air flow react in unexpected and less efficient ways.

BRIEF SUMMARY

In a first aspect, a vacuum conveyor for conveying granular material is provided. The vacuum conveyor comprises: a frame; a housing supported by the frame; a vacuum section operative to create a vacuum in the housing; an intake to allow granular material to the housing; a variable length hose section having a distal end and a proximal end, the distal end of the hose section connectable to the intake; and an intake nozzle. The intake nozzle can include: an intake end; an output end connectable to the proximal end of the hose section; a body extending between the intake end the output end; a plurality of apertures passing through the body; a sleeve sized to fit around the body. The sleeve can be positionable in at least two positions relative to the body and can have: a plurality of first vent apertures, each first vent aperture positioned on the sleeve to uncover one of the plurality of apertures in the body when the sleeve is positioned in a first position relative to the body; and a plurality of second vent apertures, each second vent aperture positioned on the sleeve to uncover one of the plurality of apertures in the body when the sleeve is positioned in the first position relative to the body and when the sleeve is positioned in a second position relative to the body.

In a second aspect, an intake nozzle for a vacuum conveyor is provided. The intake nozzle can comprises: an intake end; an output end connectable to a hose section of a vacuum conveyor; a body extending between the intake end the output end; a plurality of apertures passing through the body; a sleeve sized to fit around the body. The can be positionable in at least two positions relative to the body and comprise: a plurality of first vent apertures, each first vent aperture positioned on the sleeve to uncover one of the plurality of apertures in the body when the sleeve is positioned in a first position relative to the body; and a plurality of second vent apertures, each second vent aperture positioned on the sleeve to uncover one of the plurality of apertures in the body when the sleeve is positioned in the first position relative to the body and when the sleeve is positioned in a second position relative to the body.

DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
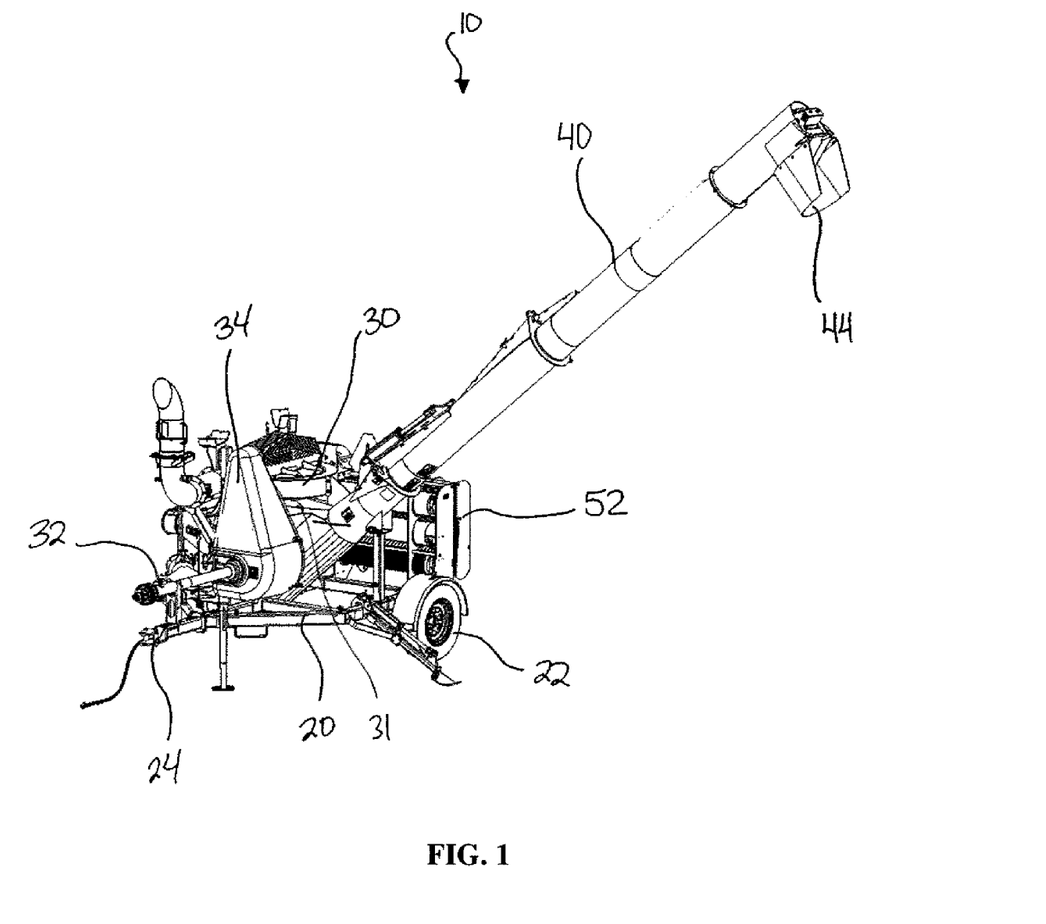
FIG. 1 is a perspective view of a vacuum conveyor.
Figure 2:
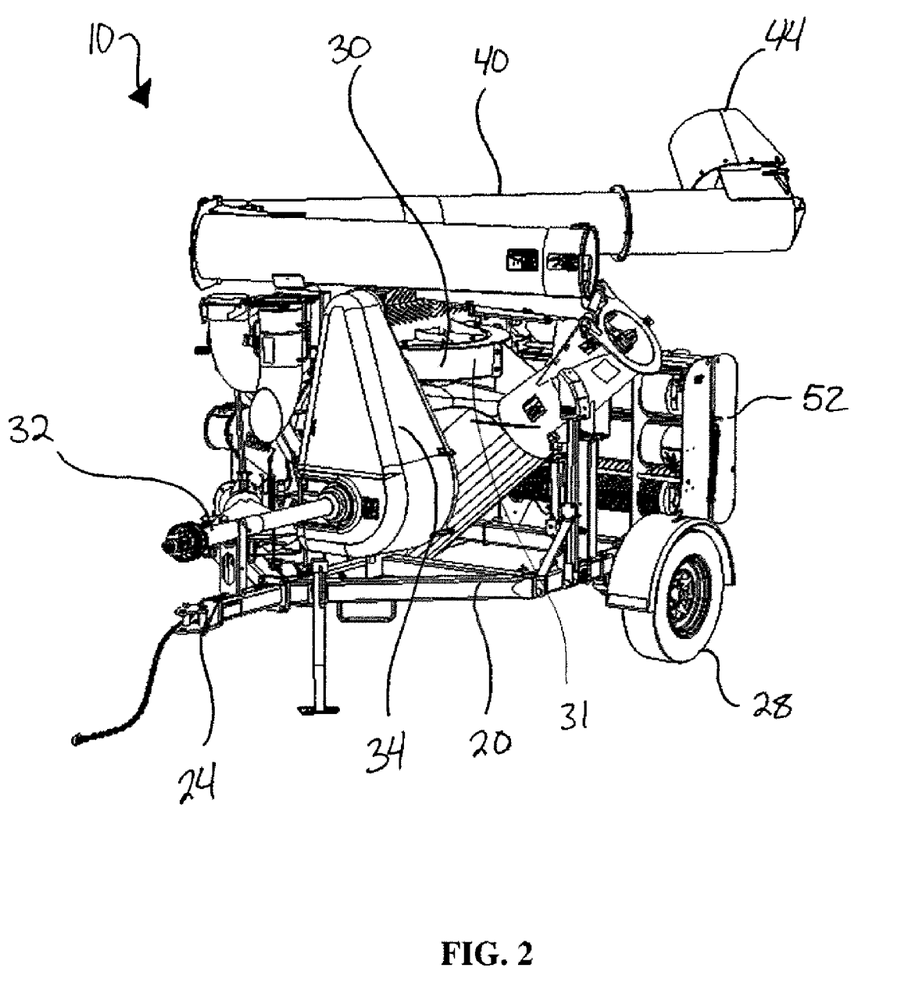
FIG. 2 is a perspective view of the vacuum conveyor of FIG. 1 in a transport position.
Figure 3:
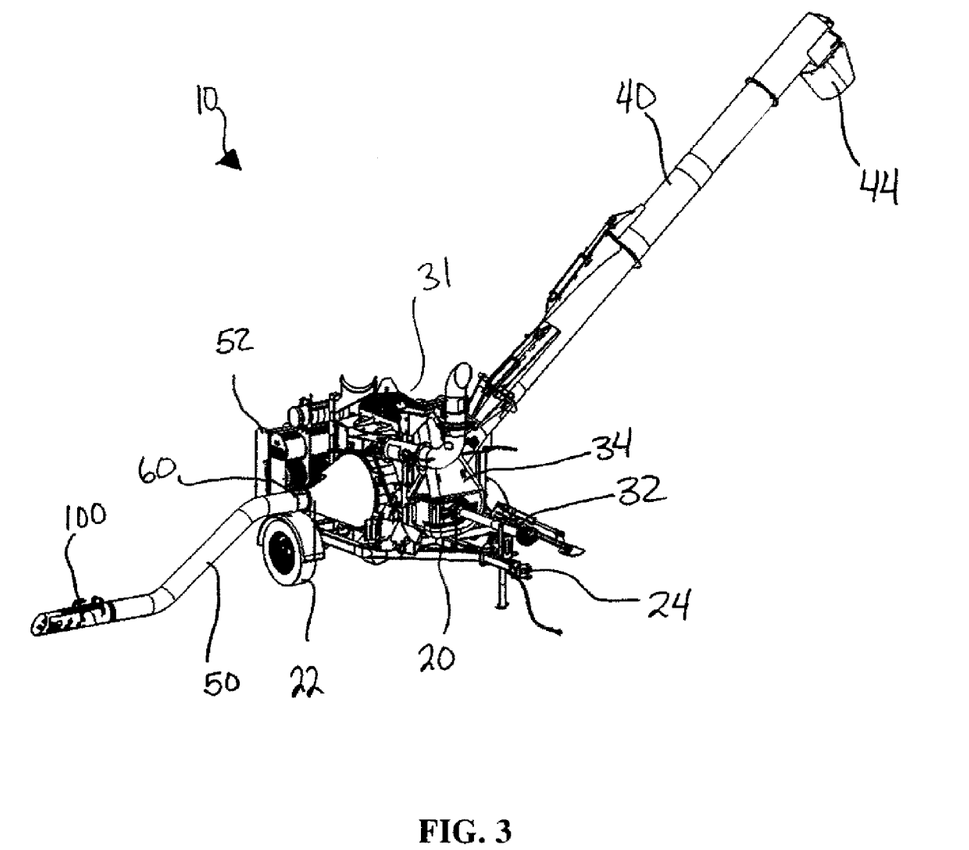
FIG. 3 is a front view of the vacuum conveyor in an operating position showing a hose section and intake nozzle installed on the vacuum conveyor.

FIGS. 1-3 illustrate a perspective view of an agricultural vacuum conveyor 10 for conveying granular material such as grain or other crop material. The vacuum conveyor 10 includes a frame 20 with ground wheel 22 to transport the vacuum conveyor 10 and a hitch assembly 24 to allow the vacuum conveyor 10 to be connected to a tow vehicle such as a tractor (not shown) for transport to a location. The vacuum conveyor 10 can have a housing 31 with a vacuum section that includes a fan assembly 30 that creates a vacuum in the housing 31 that is used to create a flow of air in a hose section 50 and an intake nozzle 100 to carry granular material up into the intake nozzle 100 and through the hose section 50 into the vacuum conveyor 10.

Inside the vacuum conveyor 10, the air flow carrying the granular material is directed into an inlet of a conveyor section 40 so that the granular material being carried in the air flow drops into the intake of the conveyor section 40 provided inside the vacuum conveyor 10, where the granular material can be carried up the conveyor section 40 to be discharged from a discharge spout 44 on the end of the conveyor section 40.

There are a number of ways to get the granular material to drop out of the air flow and into the inlet of the conveyor section 40, including a rapid change in direction of the air flow, the provision of a nozzle to change the velocity of the air flow, etc. The conveyor section 40 can have a conveyor belt, auger, etc.

The fan assembly 30 used to create the vacuum in the vacuum conveyor 10 is driven off of a PTO of the tow vehicle. A PTO shaft 32 is connected to the fan assembly 30 by a drive mechanism 34 that transfers the rotational motion of the PTO shaft 32 to the fan assembly 30 to turn a fan. The PTO shaft 32 can be connected to the PTO of the tow vehicle.

To transport the vacuum conveyor 10, the vacuum conveyor 10 can be placed in a transport position as shown in FIG. 2. The conveyor section 40 can folded up to allow easier transport and the hose section 50 and the intake nozzle 100 removed and stored in a hose storage rack 52. A tow vehicle (not shown) can be hitched to the hitch assembly 24 and the vacuum conveyor 10 towed using its ground wheels 22 by the tow vehicle.

Referring to FIG. 3, once in position to collect and convey grain material, the vacuum conveyor 10 can be positioned beside a grain bin or other place where the granular material to be conveyed is. The conveyor section 40 can be unfolded so that the discharge spout 44 can be directed to load the granular material where desired. The hose section 50 and the intake nozzle 10 can be removed from the hose storage rack 52 and a proximal end of the hose section 50 can be attached to an intake tube 60 on the vacuum conveyor 10 while the distal end of the hose section 50 can be connected to the intake nozzle 100.

To use the vacuum conveyor 10, an operator can place the end of the intake nozzle 100 into a pile of granular material to be conveyed by the vacuum conveyor 10 while the fan assembly 30 is being used to great a vacuum in the vacuum conveyor 10 and thereby creating an air flow being sucked into the hose section 50. The granular material will be sucked into the intake nozzle 100 by this air flow entering the hose section 50 and the granular material will be carried up the hose section 50 in this air flow and into the inlet of the conveyor section 40 provided inside the vacuum conveyor 10. Once in the inlet of the conveyor section 40 the granular material will pass up the conveyor section 40 to be discharged on the discharge spout 44.

Figure 4:
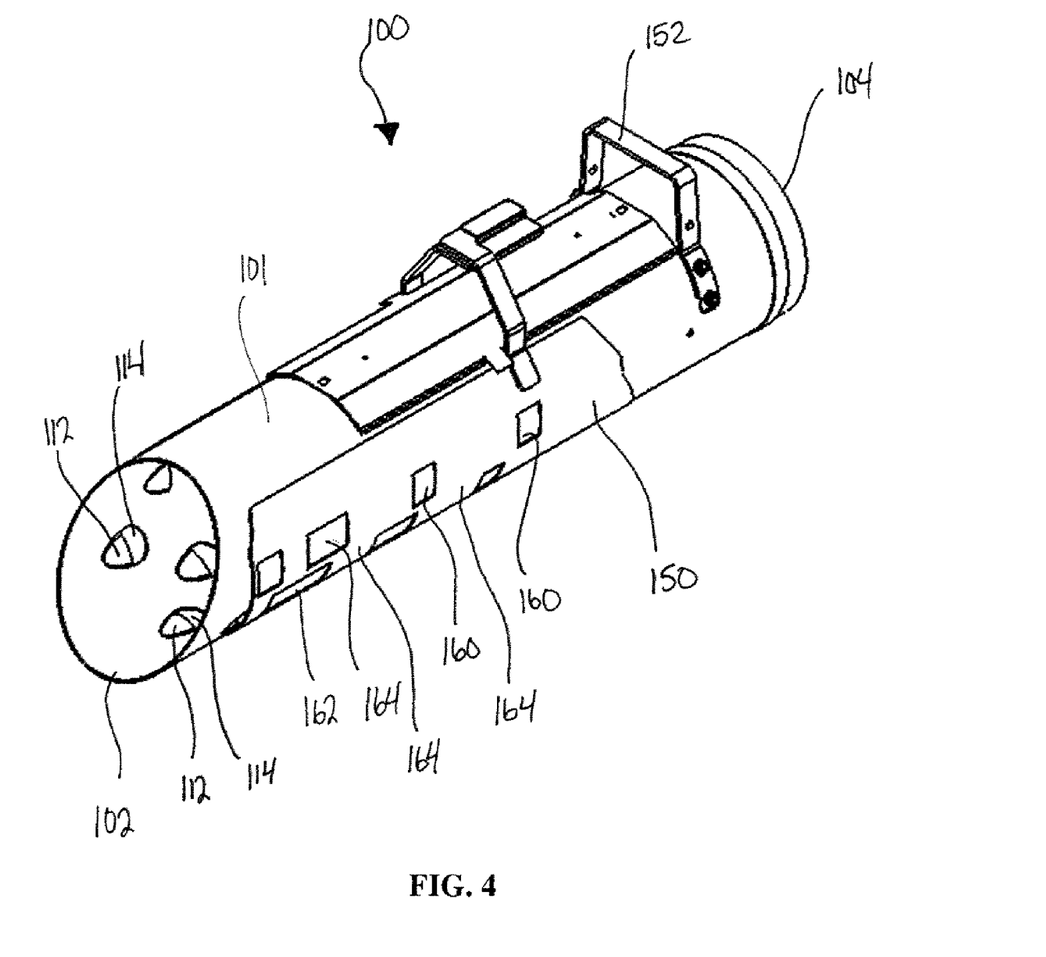
FIG. 4 is a perspective view of a intake nozzle having a sleeve.

FIG. 4 illustrates a perspective view of the intake nozzle 100. The intake nozzle 100 can have an intake end 102 that is open so that granular material can be sucked into the intake nozzle 100 through the open intake end 102 and an output end 104 connectable to the hose section 50. The body 101 of the intake nozzle 100 can extend between the intake end 102 and the output end 104. The intake nozzle 100 is generally cylindrical and can be formed from rigid tubing. When the intake end 102 of the intake nozzle 100 is placed adjacent to or in contact with granular material, the granular material can be taken up by an air flow passing through the intake nozzle 100 created by the vacuum conveyor 10 and sucked through the intake nozzle 100 and into the hose section 50 to eventually be sucked into the vacuum conveyor 10 itself.

Figure 5:
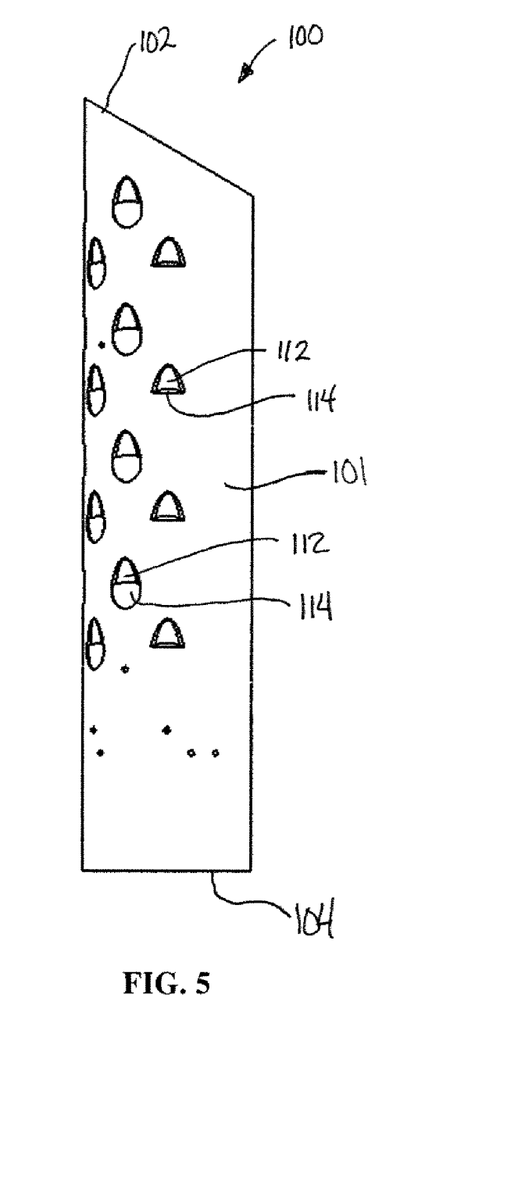
FIG. 5 is a side view of the intake nozzle with the sleeve removed.
Figure 6:
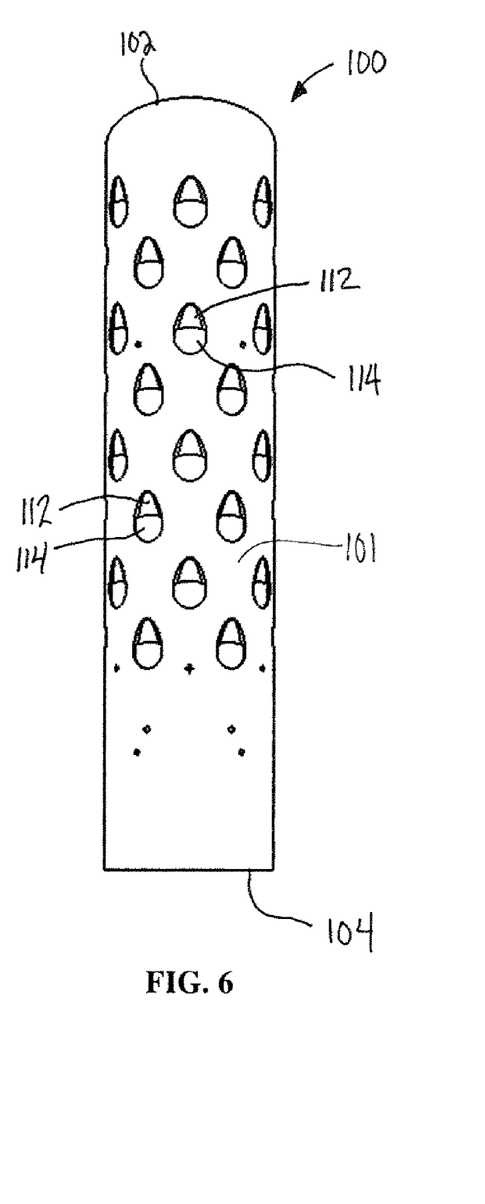
FIG. 6 is a bottom view of the intake nozzle with the sleeve removed.

A plurality of ramps 112 and corresponding apertures 114 can be provided in the body 101 of the intake nozzle 100 and arranged at intervals along the length of the body 101 of the intake nozzle 100 to improve the flow of granular material into the intake nozzle 100. In one aspect, the plurality of ramps 112 and apertures 114 can be provided in only a bottom half of the body 101 of the intake nozzle 100 as can be seen in FIGS. 5 and 6.

The intake nozzle 100 when in use will usually be horizontal or close to horizontal, such as when it is used to remove granular material from a full bin. Because of gravity, granular material sucked up into the intake nozzle 100 by an air flow created in the intake nozzle 100 and the hose section 50 by the vacuum conveyor 10, will tend to fall towards the bottom of the intake nozzle 100 and this granular material will tend to remain in the bottom of the intake nozzle 100 and hose section 50 as it travels towards the vacuum conveyor 10. The air flow passing through the intake nozzle 100 and hose section 50 will tend to be at its strongest in the middle of the intake nozzle 100 and the hose section 50. The ramps 112 and corresponding apertures 114 can induce the granular material off of the bottom of the intake nozzle 100 and improve the granular materials mixing with the air stream passing through the intake nozzle 100 to improve the performance of the vacuum conveyor 10.

Each ramp 112 in the body 100 of the intake nozzle 100 can slope inward into the interior of the intake nozzle 100 with the upstream end of each ramp 112 starting substantially at an inner surface of the body 101 of the intake nozzle 100 and extending at an angle into the interior of the intake nozzle 100 along its length to the downstream end of the ramp 112. Each corresponding aperture 114 can be provided adjacent to and underneath the downstream end of the ramp 112, between the downstream end of the ramp 112 and the inner surface of the body 101 of the intake nozzle 100, so that air can enter the interior of the intake nozzle 100 through this aperture 114 underneath the downstream end of the ramp 112.

When the intake nozzle 100 is used to suck up granular material, any granular material collecting and moving along the bottom of the intake nozzle 100 can pass over one of these ramps 112. The granular material will be carried along the inward slope formed by the ramp 112 and be directed towards the center of the intake nozzle 100 as the granular material passes the downstream end of the ramp 112. This will cause the granular material to move away from the bottom of the intake nozzle 100 and towards the center of the intake nozzle 110 were the granular material can better mix with the air flow passing through the intake nozzle 100.

The apertures 114 can further improve the operation of the ramps 112. Air will pass into the interior of the intake nozzle 100 through these apertures 114 under the ramps 112. The incoming air flow aids in moving the granular material towards the center of the interior of the intake nozzle 100 as the granular material comes off of the downstream end of the ramp 112 and this incoming air and granular material can mix with the existing air stream, further enhancing the mixing of the air flow through the intake nozzle and the granular material.

The apertures 114 can also prevent the vacuum conveyor 10 from being choked off if the intake nozzle 100 is simply thrust into a pile of granular material and the vacuum created by the vacuum conveyor is not great enough to prevent the granular material from blocking/clogging the intake nozzle 100. If the intake nozzle 100 is blocked by the granular material and the suction being created by the vacuum conveyor 10 is not high enough to pull the granular material through, air flow in the intake nozzle 100 will still occur using air being drawn in through the apertures 114.

Because the intention is to move granular material of the bottom of the intake nozzle 100, in one aspect the ramps 112 and corresponding apertures 114 may only be provided in the bottom half of the intake nozzle 100.

A ramp 112 and corresponding aperture 114 can be conveniently formed by placing a cut substantially perpendicular to an axis of the intake nozzle 100 in the wall of the intake nozzle and pushing a section of the wall with the cut inwards to form a ramp 112 and the cut will form the corresponding aperture 114 below the downstream end of the ramp 112.

However, the vacuum conveyor 10 will not always use the same length of hose section 50. In one aspect, the hose storage rack 52 can be provided with a number of sections of hose allowing an operator to connect these sections together as desired so that the operator can choose the number of sections to be connected, resulting in the hose section 50 used being longer in some circumstances and shorter in others because the operator has tailored the hose section 50 to the necessary length depending on where the granular material is relative to the vacuum conveyor 10. In one situation, the vacuum conveyor 10 might be positioned very close to the granular material and the operator may decide to only use a small section of hose for the hose section 50, for example, making the hose section 50 only 3.5 feet long. However, in other situations, the granular material may be further away from the vacuum conveyor 10 or the operator may desire more maneuverability, resulting in the operator connecting more sections of hose together to make a longer hose section 50. For example, this longer hose section 50 may be 20 feet long. In still further situations, an operator may desire the hose section 50 to be as long as possible. This longest hose section 50 will depend on the amount of vacuum the vacuum conveyor 10 can create, etc., however, in one example, an operator might make a 40 foot long hose section 50.

The longer the hose section 50 the lower the suction will be at the intake end 102 of the intake nozzle 100; with the 3.5 foot hose section 50 having the most suction at the intake nozzle 100 and the 40 foot hose section 50 having the least (assuming the fan assembly 30 operates at the same level for both lengths of hose section 50). Longer hose sections 50 will increase the chance that the suction in the intake nozzle 100 is not enough to prevent the granular material from clogging the intake nozzle 100 and stall out the fan assembly 30, while shorter hose sections 50 will not be as susceptible to this same problem with the greater suction that is achieved at the intake nozzle 100 using shorter hose sections 50. The apertures 114 can help maintain an air flow in the intake nozzle 100 and hose section 50 to prevent the granular material from clogging up the intake nozzle 100. More apertures 114 are typically beneficial for longer hose sections 40 while fewer apertures 114 are typically beneficial for shorter hose sections 50.

Figures 7, 8:
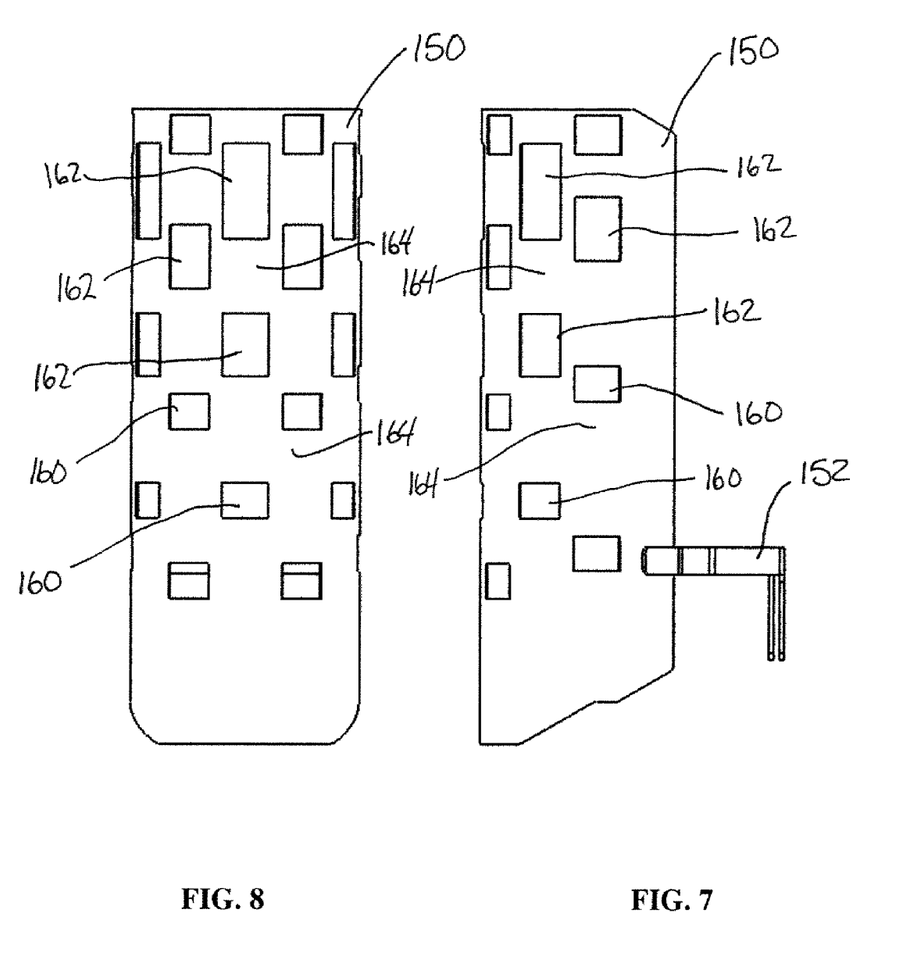
FIG. 7 is a side view of a sleeve for selectively blocking apertures in the intake nozzle.
FIG. 8 is a bottom view of the sleeve shown in FIG. 7.

A sleeve 150 can be provided that is sized to encircle the body 101 of the intake nozzle 100 and can be slidably and/or rotatably positionable with respect to the body 101 of the intake nozzle 100. The sleeve 150 can have a handle 152 to help an operator position the sleeve 150 in a desired position. The sleeve 150 can contain a plurality of first vent apertures 160, a plurality of second vent apertures 162 and a plurality of unperforated cover sections 164 that can be used to selectively block off various apertures 114 in the intake nozzle 100. Referring to FIGS. 7 and 8 a plurality of first vent apertures 160 can be provided passing through the sleeve 150. The first vent apertures 160 can be sized just right to completely uncover a ramp 112 and aperture 114 in the body 101 of the intake nozzle 100 when the sleeve 150 is adjusted so that the first vent apertures 160 are positioned over corresponding apertures 114 and do not obstruct the corresponding apertures 114 at all. When the sleeve 150 is in a single position relative to the body 101 of the intake nozzle 100, the first vent apertures 160 will be positioned over their corresponding ramps 112 and apertures 114 completely uncovering these apertures 114 and allowing air to flow into the interior of the body 101 of the intake nozzle 100 through these uncovered apertures 114.

The sleeve 150 can also contain a plurality of second vent apertures 162. These second vent apertures 162 will be larger than the first vent apertures 160 because they will be designed to leave a corresponding ramp 112 and aperture 114 completely uncovered while the sleeve 150 is in more than a single position. The second vent apertures 162 will typically be longer than the first vent apertures 160 so that the sleeve 150 can be moved for some distance relative to the body 101 of the intake nozzle 100 while the second vent apertures 162 leave their corresponding ramps 112 and apertures 114 uncovered so that the corresponding apertures 114 are not even partially covered by the sleeve 150 in these positions.

A plurality of unperforated cover sections 164 can also be provided on the sleeve 150 adjacent to the first vent apertures 160 and the second vent apertures 162 so that when the sleeve 150 is moved into a specific position relative to the body 101 of the intake nozzle 100, the cover sections 164 cover the ramps 112 and apertures 114.

In one aspect, all or most of the second vent apertures 162 can be positioned closer to the intake end 102 of the intake nozzle 100 so that the second vent aperture 162 can be used to uncover apertures 114 in the body 101 of the intake nozzle 100 closer to the intake end 102 while the apertures 114 in the body 101 of the intake nozzle 100 closer to the output end 104 can remain covered by the sleeve 150.

By using the first vent apertures 160, the second vent apertures 162 and the cover sections 164, the sleeve 150 can be positioned in a number of positions relative to the body 101 of the intake nozzle 100 where in each position a different number of the plurality of ramps 112 and apertures 114 are completely uncovered or covered by the sleeve 150. By having some ramps 112 and apertures 114 completely uncovered while others are completely covered, the cross sectional areas of the uncovered apertures 114 are not altered and therefore the air flow through these uncovered apertures 114 into the interior of the intake nozzle 100 is not restricted while the total air flow into the intake nozzle 100 through the apertures 114 is reduced because of the covered apertures 114. The placement of the first vent apertures 160, second vent apertures 162 and cover section 164 can allow the sleeve 150 to: completely cover all of the ramps 112 and apertures 114; completely uncover some of the ramps 112 and apertures 114 while the other ramps 112 and apertures 114 remain completely covered by cover sections 164 of the sleeve 150; or completely uncover all of the ramps 112 and apertures 114. In this manner, instead of only partially covering some of the apertures 114 and reducing the air flow through all of the apertures 114, the sleeve 150 can completely uncover some of the apertures 114 therefore not restricting the air flow through these uncovered apertures 114, while at the same time completely covering other apertures 114 so that the air flow entering through these uncovered apertures 114 is not restricted by the sleeve 150 but the air flow entering the intake nozzle 100 overall through all of the apertures 114 is reduced.

Figure 9:
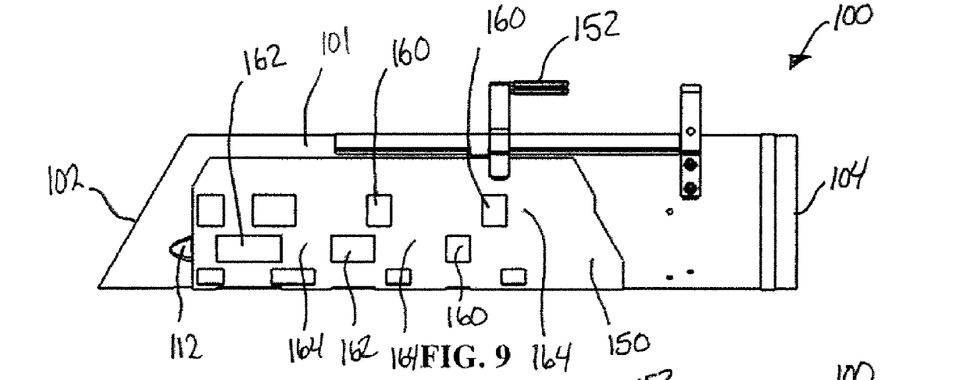
FIG. 9 is a side view of the intake nozzle with the sleeve in a third position.
Figure 10:
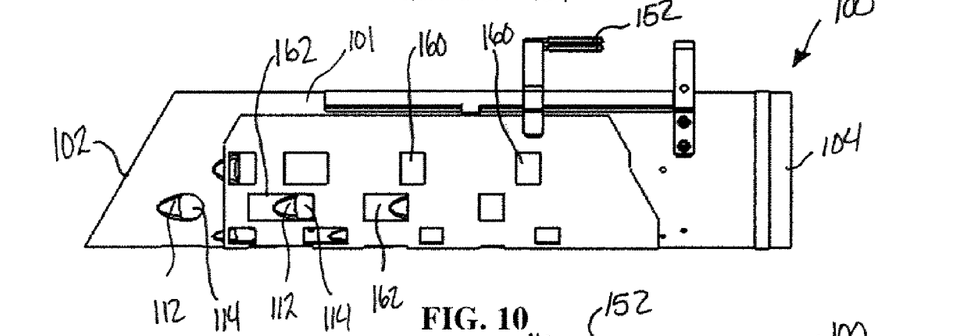
FIG. 10 is a side vice of the intake nozzle with the sleeve in a second position.
Figure 11:
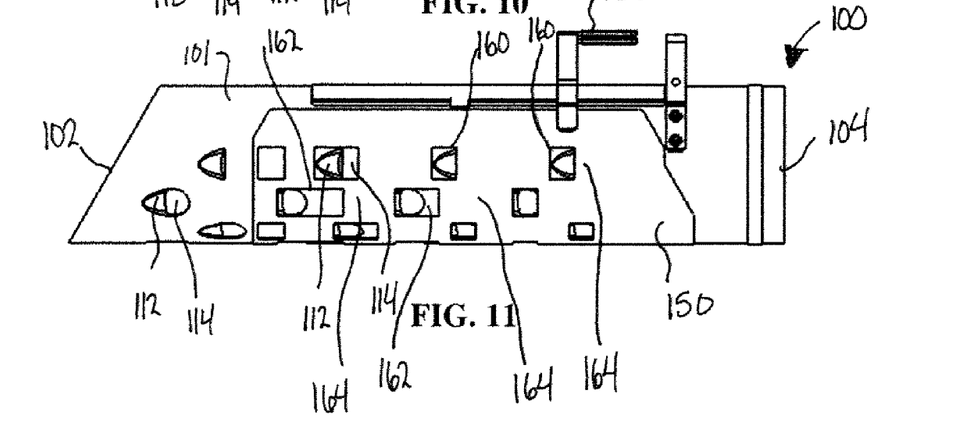
FIG. 11 is a side vice of the intake nozzle with the sleeve in a first position.

FIGS. 9-11 shows three positions of the sleeve 150 to vary the amount of air that is allowed to enter the interior of the intake nozzle 100 through the apertures 114. The sleeve 150 can either be just positioned in the proper place by an operator and held there by the operator for these positions or there can be some mechanism that indicates when the sleeve 150 is in one of the positions and allows the operator to lock the sleeve 150 in any of these three positions. FIG. 9 illustrates an example of a positioning of the sleeve 150 in a third position where the apertures 114 are covered by the cover sections 164 of the sleeve 150 and the first vent apertures 160 and the second vent apertures 162 are not uncovering any of the apertures 114. This position might be used when the hose section 50 is really short (such as 3.5 feet) because the short hose section 50 will result in higher suction at the inlet end 102 of the intake nozzle 100. FIG. 10 illustrates a second position where the second vent apertures 162 are completely uncovering some of the ramps 112 and apertures 114 while the first vent apertures 160 are still not uncovering their corresponding ramps 112 and apertures 114. This position might be used where the hose section 50 is of medium length and some air flow through the apertures 114 into the intake nozzle 100 is desired but not the full amount. FIG. 11 illustrates a first position where the first vent apertures 160 and the second vent apertures 162 are all uncovering ramps 112 and apertures 114. The size of the second vent apertures 162 have allowed each second vent apertures 162 to keep its corresponding ramp 112 and apertures 114 uncovered even though the sleeve 150 has been moved relative to the body 101 of the intake nozzle 100 to this third position. As can be seen in FIGS. 10 and 11, the ramps 112 and apertures 114 corresponding with a second vent aperture 162 have moved from one side of the second vent apertures 162 to the other. However, because of the larger size of the second vent apertures 162 the ramps 112 and apertures 114 remain uncovered in both positions. The first position shown in FIG. 11 might be used when the longest length of the hose section 50 is used.

As can be seen in FIGS. 10 and 11, the apertures 114 uncovered by the second vent apertures 162 are positioned closer to the intake end 102 of the intake nozzle 100 then the apertures 114 that are uncovered by the first vent apertures 160 when the sleeve 150 is moved into the first position.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A vacuum conveyor for conveying granular material, the vacuum conveyor comprising:
    a frame;
    a housing supported by the frame;
    a vacuum section operative to create a vacuum in the housing;
    an intake to allow granular material into the housing;
    a variable length hose section having a distal end and a proximal end, the distal end of the hose section connectable to the intake; and
    an intake nozzle comprising;
        an intake end;
        an output end connectable to the proximal end of the hose section;
        a body extending between the intake end and the output end;
        a plurality of apertures passing through the body;
        a sleeve sized to fit around the body, the sleeve positionable in at least two positions relative to the body and comprising:
            a plurality of first vent apertures, each first vent aperture positioned on the sleeve to uncover one of the plurality of apertures in the body when the sleeve is positioned in a first position relative to the body; and
            a plurality of second vent apertures, each second vent aperture positioned on the sleeve to uncover one of the plurality of apertures in the body when the sleeve is positioned in the first position relative to the body and when the sleeve is positioned in a second position relative to the body.

2. The vacuum conveyor of claim 1 further comprising at least one group wheel operably connected to the frame.

3. The vacuum conveyor of claim 2 further comprising a hitch assembly connected to the frame.

4. The vacuum conveyor of claim 1 wherein the vacuum section is connected to a discharge conveyor section and wherein granular material that travels through the hose section into the vacuum conveyor is directed into the discharge conveyor section.

5. The vacuum conveyor of claim 4 wherein the conveyor section comprises an auger and has a discharge spout.

6. The vacuum conveyor of claim 1 wherein each first vent aperture positioned on the sleeve uncovers the one of the plurality of apertures in the body only when the sleeve is positioned in the first position relative to the body.

7. The vacuum conveyor of claim 1 wherein the sleeve further comprises a plurality of unperforated cover sections, each unperforated cover section covering one of the plurality of the apertures in the body when the sleeve is in a third positon relative to the body.

8. The vacuum conveyor of claim 7 wherein each unperfortated cover section is provided adjacent to one of: one of the plurality of first vent apertures; and one of the plurality of second vent apertures.

9. The vacuum conveyor of claim 8 wherein the unperforated cover sections adjacent to one of the plurality of first vent apertures cover apertures in the body when the sleeve is positioned in the second position relative to the body.

10. The vacuum conveyor of claim 1 wherein each first vent aperture completely uncovers the one of the plurality of apertures in the body when the sleeve is positioned in the first position relative to the body.

11. The vacuum conveyor of claim 1 wherein each second vent aperture completely uncovers the one of the plurality of apertures in the body when the sleeve is positioned in the first position relative to the body and when the sleeve is positioned in the second position relative to the body.

12. The vacuum conveyor of claim 1 wherein each second vent aperture is larger than each first vent aperture.

13. The vacuum conveyor of claim 1 wherein the second vent apertures are positioned closer to the intake end of the intake nozzle than the output end.

14. The vacuum conveyor of claim 1 wherein the body of the intake nozzle is generally cylindrical.

15. The vacuum conveyor of claim 1 wherein the apertures in the body of the intake nozzle are provided only in a bottom half of the body of the intake nozzle.

16. The vacuum conveyor of claim 1 wherein each aperture in the body of the intake nozzle has a corresponding ramp.

17. The vacuum conveyor of claim 16 wherein each ramp slopes inwards from an inner surface of the body of the intake nozzle towards a centerline of the intake nozzle.

18. The vacuum conveyor of claim 17 wherein an upstream end of each ramp substantially coincides with the inner surface of the body of the intake nozzle, the ramp sloping inwards from the inner surface of the body of the intake nozzle to a downstream end of the ramp.

19. The vacuum conveyor of claim 18 wherein the aperture is adjacent to and underneath the downstream end of the ramp.

20. An intake nozzle for a vacuum conveyor, the intake nozzle comprising:
    an intake end;
    an output end connectable to a hose section of a vacuum conveyor
    a body extending between the intake end the output end;
    a plurality of apertures passing through the body;
    a sleeve positionable in at least two positions relative to the body and comprising:
        a plurality of first vent apertures, each first vent aperture positioned on the sleeve to uncover one of the plurality of apertures in the body when the sleeve is positioned in a first position relative to the body; and
        a plurality of second vent apertures, each second vent aperture positioned on the sleeve to uncover one of the plurality of apertures in the body when the sleeve is positioned in the first position relative to the body and when the sleeve is positioned in a second position relative to the body.

21. The intake nozzle of claim 20 wherein each first vent aperture positioned on the sleeve uncovers the one of the plurality of apertures in the body only when the sleeve is positioned in the first position relative to the body.

22. The intake nozzle of claim 20 wherein the sleeve further comprises a plurality of unperforated cover sections, each unperforated cover section covering one of the plurality of the apertures in the body when the sleeve is in a third position relative to the body.

23. The intake nozzle of claim 22 wherein each unperforated cover section is provided adjacent to one of: one of the plurality of first vent apertures; and one of the plurality of second vent apertures.

24. The intake nozzle of claim 23 wherein the unperforated cover sections adjacent to one of the plurality of first vent apertures cover apertures in the body when the sleeve is positioned in the second position relative to the body.

25. The intake nozzle of claim 20 wherein each first vent aperture completely uncovers the one of the plurality of apertures in the body when the sleeve is positioned in the first position relative to the body.

26. The intake nozzle of claim 20 wherein each second vent aperture completely uncovers the one of the plurality of apertures in the body when the sleeve is positioned in the first position relative to the body and when the sleeve is positioned in the second position relative to the body.

27. The intake nozzle of claim 20 wherein each second vent aperture is larger than each first vent aperture.

28. The intake nozzle of claim 20 wherein the second vent apertures are positioned closer to the intake end than the output end.

29. The intake nozzle of claim 20 wherein the body is generally cylindrical.

30. The intake nozzle of claim 20 wherein the sleeve has a handle.

31. The intake nozzle of claim 20 wherein the apertures are provided only in a bottom half of the body.

32. The intake nozzle of claim 20 wherein each aperture has a corresponding ramp.

33. The intake nozzle of claim 20 wherein each ramp slopes inwards from an inner surface of the body towards a centerline of the intake nozzle.

34. The intake nozzle of claim 33 wherein an upstream end of each ramp substantially coincides with the inner surface of the body, the ramp sloping inwards from the inner surface of the body to a downstream end of the ramp.

35. The intake nozzle of claim 34 wherein the aperture is adjacent to and underneath the downstream end of the ramp.

* * * * *